Inventor
PETER NORMAN
By D. A. Warner
Attorney 3,492,595
NEGATIVE FEEDBACK AMPLIFIERS
Peter Norman, Dartford, Kent, England, assignor to International Standard Electric Corporation
Filed Dec. 22, 1967, Ser. No. 692,861
Claims priority, application Great Britain, Jan. 1, 1967, 549/67
Int. Cl. H03f 1/34
U.S. Cl. 330—100 3 Claims

ABSTRACT OF THE DISCLOSURE

A three stage negative feedback amplifier is provided with overall feedback between the last and first stages and local feedback associated with the first and last stages. The relative feedback associated with the first and last stages is varied while the overall feedback is held constant to keep the loop gain of the amplifier relatively constant at all frequencies.

This invention relates to negative feedback amplifiers and more particularly to gain control networks for such amplifiers.

The gain-frequency characteristic of amplifiers for use in multichannel carrier systems must be made to compensate for the attenuation introduced by the transmission medium such as cable or open wire line. As the attenuation of the medium invariably increases with frequency, the amplifier gain is made to increase accordingly.

In practice it has been found convenient to provide at each repeater two equalisers which serve different purposes and which can be controlled independently of each other. The first of these is of the preset type and is adjusted in accordance with the length of the preceding cable section. The second equaliser is of the continuously variable type and is used to take up changes in cable attenuation caused by variation in ambient temperature. For this purpose a thermistor which is controlled by a pilot signal transmitted with the signal currents is included in the equalising network.

It is known to include such equalising networks in the feedback path of the amplifier. A type of amplifier frequently used comprises three amplifying stages in which an overall feedback path extends from the cathode of the last stage to the cathode of the first stage, or when transistors are used instead of valves, from the emitter of the last stage to the emitter of the first stage. In addition the first and last stages are also provided with local feedback loops which lie substantially outside the main feedback loop.

When the equalising network is connected in the main feedback path, the feedback factor $\beta$ is made to vary with the frequency of the input signal. The loop gain of the amplifier which is given by the product $\mu\beta$ will therefore also vary. Since the stability, the signal to noise ratio and other parameters of the amplifier depend on the loop gain it is desirable to be able to vary the shape of the through gain characteristic without altering the loop gain.

According to the invention there is provided an amplifier for electrical signals having a gain path comprising three stages of amplification, an overall feedback path between the first and last stages and local feedback paths associated with the first and last stages. Said feedback paths include at least one fixed and one variable equalising network to shape the through gain-frequency characteristic by altering substantially the local feedback paths only so that over the entire operating frequency range and for all settings of the variable equaliser the loop gain of the amplifier remains substantially constant.

The invention will now be described with reference to the accompanying drawings in which.

Figure 1:
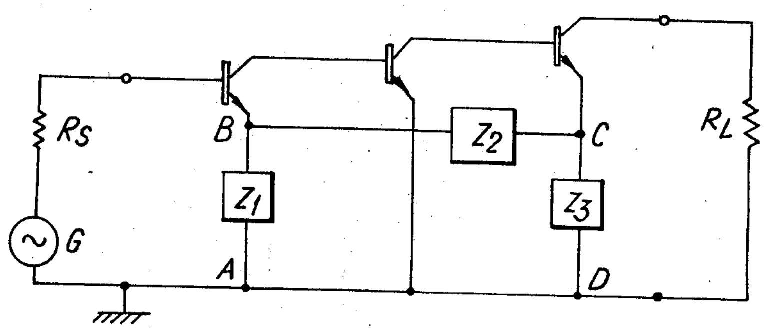
FIG. 1 shows in block schematic form a known type of negative feedback amplifier.

The basic circuit of a three stage negative feedback amplifier shown in FIG. 1 comprises an overall feedback loop represented by an impedance $Z_2$ which is connected between emitters of the first and last stage. For clarity the usual power supply and interstage coupling circuits are omitted. In addition the first and last stages are provided with local feedback, by the impedances $Z_1$ and $Z_3$. The source of the signal to be amplified is indicated by the generator G of internal impedance $R_s$. The output of the amplifier is connected to load represented by resistor $R_L$.

It can be shown that the through gain of the amplifier is proportional to $$\frac{Z_1+Z_2+Z_3}{Z_1Z_3}$$

when a reasonable amount of feedback is used. Similarly the loop gain is proportional to $Z_2$ and independent of $Z_1$ and $Z_3$ provided the impedances looking into the emitters of the first and third transistors are substantially less than $Z_1$ and $Z_3$, a condition that is reasonably easy to obtain in practice.

From the foregoing, it becomes apparent that if the preset and variable equalisers mentioned before are arranged to form part of the impedances $Z_1$ and $Z_3$ the through gain of the amplifier can be equalised without altering the loop gain. If the loop gain- frequency characteristic also requires shaping this can be done by designing $Z_2$ to give an impedance-frequency characteristic of the desired shape. When two separate equalising networks are to be used in an amplifier it is essential that interaction between them, for example due to network impedance changes should be avoided.

Figure 2:
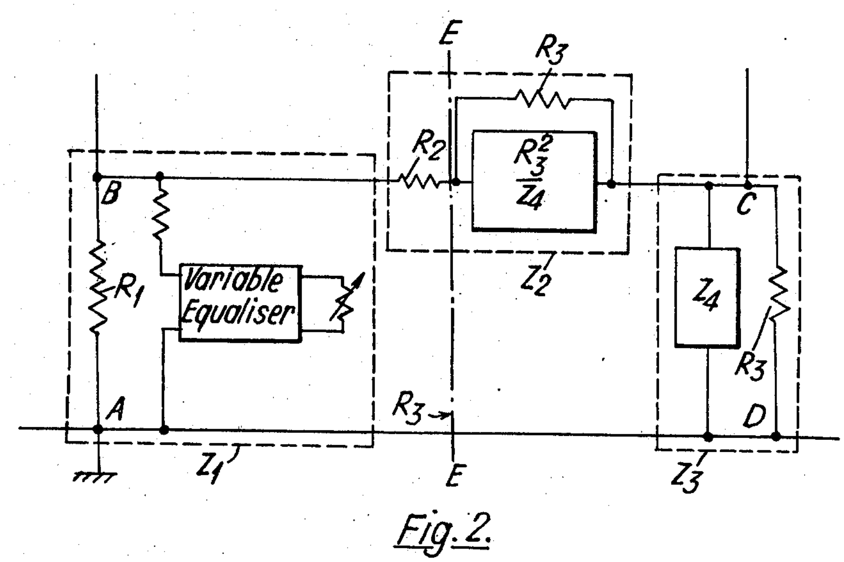
FIG. 2 is a schematic of an amplifier according to one embodiment of the invention.

The arrangement according to FIG. 2 for simplicity shows only that part of the circuit which is connected between points designated by ABCD of FIG. 1. The continuously variable equaliser forms part of the emitter circuit of the first stage. A network particularly suited for the purpose has been described by H. W. Bode in Bell System Technical Journal, April 1938. This network has the particular advantage that its impedance-frequency characteristic as measured across two of its terminals can be controlled by a single variable resistance element, for example a thermistor. For the correct operation of the Bode equaliser it is required that the impedance of the circuit across which it is connected is resistive and remains constant over the required frequency band.

If a second equalising network is required for example to match the amplifier characteristic to the length of cable section preceding it, the impedance looking from $Z_1$ into $Z_2+Z_3$ of FIG. 1 must be resistive and constant.

A circuit disclosed in British patent specification No. 679,424 solves this requirement by using for the impedance $Z_2$ a three terminal constant resistance equaliser. As this equaliser forms part of the overall feedback, the loop gain $\mu\beta$ is also affected.

In the circuit according to FIG. 2, in which where applicable the same designations are used as in FIG. 1, the fixed equaliser is constituted by an impedance $Z_3$ in the emitter electrode of the third transistor this impedance comprising a resistor of value $R_3$ shunted by an impedance $Z_4$. A second impedance network $Z_2$ comprising a second resistor of value $R_3$ shunted by an impedance of value $R_3^2/Z_4$ is included in the main feedback path. These two networks have inverse characteristics which means that the impedance looking to the right of line E—E is a pure resistance of value $R_3$ over the frequency band in question. Resistor $R_2$ is included in the overall feedback path to adjust the flat gain of the amplifier.

In practical amplifiers the value of the impedance formed by $R_3^2/Z_4$ in parallel with $R_3$ will be substantially less than $R_2$. Also the impedances $Z_1$ and $Z_3$ will be less than $Z_2$. For these reasons it will be found that the variation of $Z_2$ with frequency will be small i.e. the loop gain of the amplifier will remain substantially constant.

Cases arise when it is required to shape the loop gain characteristic or when the total amount of through gain shaping is so large that it cannot be achieved without altering the loop gain. In such cases a further network is inserted in the main feedback path as indicated by reference N in FIG. 3. In order to present the correct terminating impedance to the variable equaliser $Z_1$, equaliser N is of the constant impedance type. It comprises a series impedance $Z_5$ and a shunt network $$\frac{(R_2+R_3)^2}{Z_5}$$

in the overall feedback path, the networks having inverse characteristics. Equalisers having other configurations can be used provided they present a constant resistance to the variable equaliser.

Figure 3:
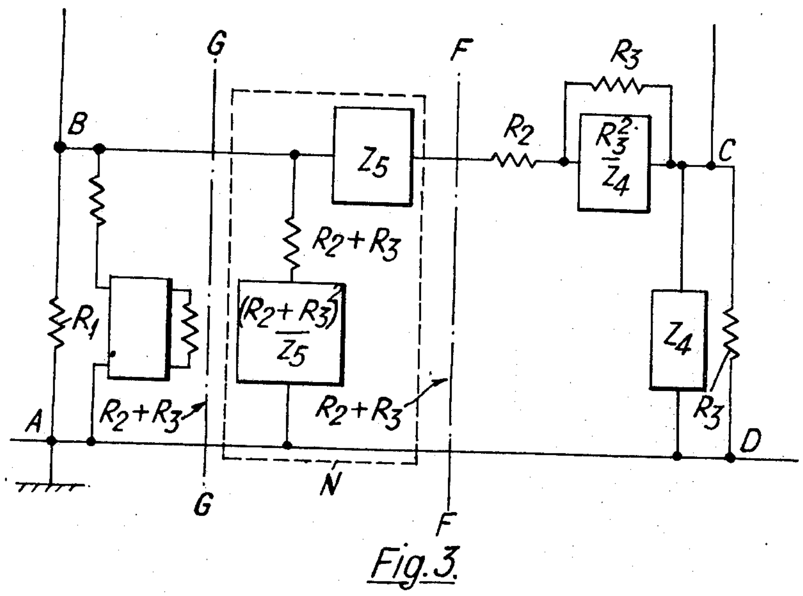
FIGS. 3 and 4 show modifications of the circuit of FIG. 2.
Figure 4:
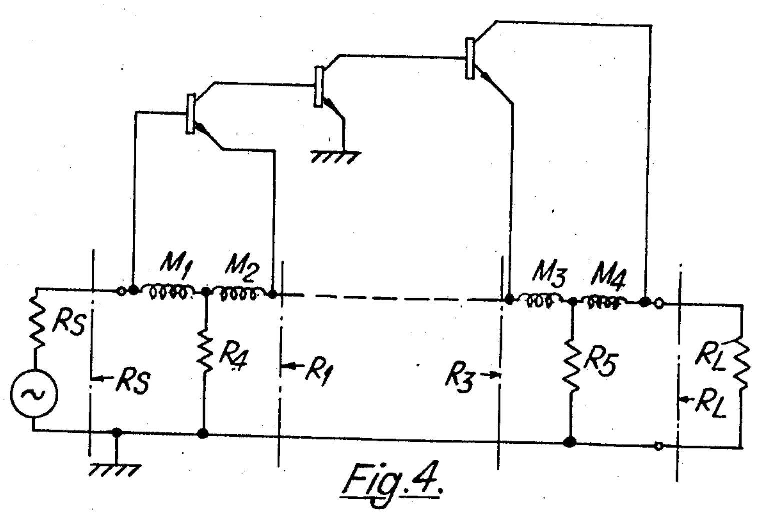

The input and output impedances of the amplifier circuits according to FIGS. 1 to 3 are high and would not match the cable or line impedances thereby causing reflections. This disadvantage is overcome by including in the feedback path hybrid transformers associated with the input and output circuits of the amplifiers shown in FIG. 3. This is shown in FIG. 4 in which the equalising networks of FIGS. 2 and 3 have been omitted for clarity. In this arrangement the impedances presented to the source and load impedances are given by $$R_s=\frac{\mu_1+\mu_2}{\mu_2}R_4$$

and $$R_L=\frac{\mu_3+\mu_4}{\mu_4}R_5$$

and the impedances terminating the overall feedback path are given by $$R_1=\frac{\mu_1+\mu_2}{\mu_1}R_4$$

and $$R_3=\frac{\mu_3+\mu_4}{\mu_3}R_5$$

where $\mu_1$ to $\mu_4$ are the number of turns of the windings of the respective transformers and $R_4$ and $R_5$ are terminating resistors.

It is to be understood that the following description of specific examples of this invention is made by way of example only and is not to be considered as a limitation on its scope.

What is claimed is:

1. An amplifier for electrical signals having a gain path comprising three stages of amplification, an overall feedback path between the first and last stages, first and second local feedback paths associated respectively with the first and the last stages, the second local feedback path including a fixed equalizing network formed by a resistor of value $R_1$ shunted by an impedance of value $Z_1$, the overall feedback path including a resistor of value $R_1$ shunted by an impedance of value $$R_1^2/Z_1$$

the total impedance of the second local feedback path and the overall feedback path in series being equal to a resistance of said value $R_1$, the first local feedback path including a variable equalizing network incorporating a single variable resistor to control the impedance-frequency characteristic presented to said gain path, and said equalizing networks shaping the through gain-frequency characteristic by altering substantially the local feedback paths only to provide that the loop gain of the amplifier remains substantially constant over the entire operating frequency range and for all settings of the variable equalizer.

2. An amplifier as claimed in claim 1 further comprising, connected in the overall feedback path, a fixed equalizing network for the purpose of shaping the loop gain-frequency characteristic of the amplifier and a fixed resistor of value $R_2$ to set the flat gain of the amplifier, said further equalizing network comprising an impedance $Z_2$ serially connected into the overall feedback path and shunting said path an impedance of value $$(R_1+R_2)^2/Z_2$$

connected in series with a resistor of value $(R_1+R_2)$.

3. An amplifier as claimed in claim 1 in which the gain path and the overall feedback path are interconnected at each end of the amplifier by means of hybrid networks, one of said networks also providing means to connect the amplifier to a source of signal to be amplified and the other network providing means to connect a load for the amplified signal.

References Cited

UNITED STATES PATENTS

| | | | |
|---|---|---|---|
| 2,096,027 | 10/1937 | Bode | 330—105 X |
| 2,337,423 | 12/1943 | Stillwell | 330—88 |
| 2,892,042 | 6/1959 | Leypold et al. | 330—88 X |

FOREIGN PATENTS

| | | |
|---|---|---|
| 697,424 | 9/1952 | Great Britain. |
| 678,473 | 1/1964 | Canada. |

ROY LAKE, Primary Examiner

J. B. MULLINS, Assistant Examiner

U.S. Cl. X.R.

330—28, 88, 103, 105